United States Patent
Murata et al.

[11] Patent Number: 5,861,205
[45] Date of Patent: Jan. 19, 1999

[54] NO$_X$-CLEANING PAVING BLOCK

[75] Inventors: Yoshihiko Murata; Hiroshi Obata; Hideo Tawara; Kozo Murata, all of Omiya, Japan

[73] Assignee: Mitsubishi Materials Corporation, Tokyo, Japan

[21] Appl. No.: 789,204

[22] Filed: Jan. 24, 1997

[30] Foreign Application Priority Data

| Jan. 24, 1996 | [JP] | Japan | 8-010010 |
| May 22, 1996 | [JP] | Japan | 8-126659 |
| Aug. 6, 1996 | [JP] | Japan | 8-206764 |
| Sep. 24, 1996 | [JP] | Japan | 8-251359 |

[51] Int. Cl.$^6$ ................. B01J 23/00
[52] U.S. Cl. .......... 428/141; 428/143; 428/149; 428/150; 428/213; 428/312.2; 428/312.8; 428/689; 428/328; 428/156; 502/349; 502/350
[58] Field of Search .............. 428/143, 141, 428/149, 156, 150, 213, 312.2, 312.8, 689, 328; 502/349, 350

[56] References Cited

U.S. PATENT DOCUMENTS

| 4,218,260 | 8/1980 | Metzler | 106/98 |
| 5,120,690 | 6/1992 | Jung et al. | 501/155 |
| 5,376,705 | 12/1994 | Leys et al. | 523/417 |
| 5,445,437 | 8/1995 | Adamson | 299/39 |
| 5,494,513 | 2/1996 | Fu et al. | 106/672 |

*Primary Examiner*—William P. Watkins, III
*Attorney, Agent, or Firm*—Oblon, Spivak, McClelland, Maier & Neustadt, P.C.

[57] ABSTRACT

An NO$_x$-cleaning paving block comprising a surface layer which contains titanium dioxide and which is layered on a concrete-made base layer.

13 Claims, 7 Drawing Sheets

$NO_x$-CLEANING PAVING BLOCK

BACKGROUND OF THE INVENTION

1. Field of the Invention

The present invention relates to an $NO_x$-cleaning paving block, and more particularly to an $NO_x$-cleaning paving block which has an enhanced $NO_x$-cleaning capability because of an increased efficiency of fixing $NO_x$ from the air and an increased pluvial $NO_x$-cleaning efficiency, thus helping to protect the environment, and is provided with a non-slip property, wear resistance and further a very decorative property.

2. Description of the Background

Air pollution because of $NO_x$ which is present in exhaust gas discharged from automobiles, particularly diesel motorcars, remains a problem because of the ever increasing number of automobiles in use, because of increased traffic congestion, and the like.

Known $NO_x$ concentration-lowering materials include metal oxides, of which titanium dioxide is known to have a strong photocatalytic action. Research into removing $NO_x$ by the strong photocatalytic action of titanium dioxide has attracted increasing interest in recent years, and the removal of $NO_x$ from the atmosphere upon contact of the $NO_x$ with the external walls of buildings constructed of sheets or panels which incorporate titanium oxide therein is nearing the commercial stage.

The present inventors have conducted research on sheets and panels which can be used for constructing the external walls of buildings, particularly in view of the conditions under which they can be used for paving purposes, and have found that a paving block formed of a combination of a dough comprising cement, titanium dioxide powder and sand, and a concrete base functions as a $NO_x$-cleaning paving block (interlocking block) which efficiently removes $NO_x$ over time without deterioration of the catalytic property of titanium dioxide, and has an excellent non-slip property and wear resistance suitable for paving purposes. It also has a very decorative property. The $NO_x$-cleaning paving block has been studied from various aspects in order to increase its performance, with the findings that:

1) the surface layer material must be exposed to a maximum dose of ultraviolet light; and
2) the $NO_x$ gas which evolves during the night must be temporarily adsorbed on an adsorbing material from which the gas must be removed during the day. These findings are at the base of the present invention.

SUMMARY OF THE INVENTION

Accordingly, one object of the present invention is to provide an $NO_x$-cleaning paving block which efficiently removes $NO_x$, which has an excellent non-slip property and durability, and thus is able to help protect the environment.

Another object of the present invention is to provide an $NO_x$-cleaning paving block which has an increased $NO_x$-removing efficiency and an enhanced pluvial $NO_x$-cleaning effect, and thus is able to help to protect the environment.

Still another object of the present invention is to provide an $NO_x$-cleaning paving block which has an increased $NO_x$-cleaning capability and a non-slip property, is capable of cleaning $NO_x$ even during the night, and is very decorative.

Briefly, these objects and other objects of the present invention as hereinafter will become more readily apparent can be attained by a $NO_x$-cleaning paving block which comprises a surface layer which contains titanium dioxide and is layered on a concrete-made base layer.

BRIEF DESCRIPTION OF THE DRAWINGS

The invention may be better understood when the specification is read with reference to the accompanying drawings, in which.

DETAILED DESCRIPTION OF THE PREFERRED EMBODIMENTS

The surface layer of the $NO_x$-cleaning paving block of the invention contains 100 parts by weight of cement, 5–50 parts by weight of titanium oxide powder and 100–700 parts by weight of sand and is layered on a concrete-made base layer in a preferred embodiment. The concrete-made base layer provides the $NO_x$-cleaning paving block of the present invention with durability, and changes $NO_x$ to nitrate ions by the action of titanium oxide. Since the nitrate ions are stabilized by being neutralized with the alkaline components of the concrete, the environment is satisfactorily protected. Since the slippery property of the titanium dioxide powder is suppressed by the addition of sand to the surface layer, the surface layer has an excellent anti-slip property. The surface layer has an excellent anti-slip property and durability because of the incorporation of cement and sand. As a result, the $NO_x$-cleaning paving block of the present invention can be satisfactorily used for paving purposes.

The present $NO_x$-cleaning paving block is characterized by asperities on the surface layer containing a titanium oxide, specifically titanium dioxide, which are formed with taps. This characteristic aspect of the invention enhances the $NO_x$-cleaning capability, anti-slip property and decorative property of the paving block.

In addition, since the present $NO_x$-cleaning paving block contains an adsorbing material in the surface layer, not only the $NO_x$ adsorbed thereon during the day is removed by decomposition by sunlight (specifically ultraviolet light) during the day, but also $NO_x$ is adsorbed on the adsorbing material even during the night and decomposed by ultraviolet light during the day, thus removing $NO_x$.

The photocatalytic efficiency can be increased by increasing the available surface area by setting the void volume of the surface layer of the $NO_x$-cleaning paving block to 10–40% or higher and the water permeability thereof to 0.01 cm/sec. or higher. Further, when the present $NO_x$-cleaning paving block has an increased water permeability, the pluvial cleaning effect is also increased. Accordingly, the invention provides a highly economical, $NO_x$-cleaning paving block.

Throughout the specification and the claims, the term "for paving purposes" includes within its scope the "paving sideways or roadways", and the term "paving block" includes within its scope "blocks which can be laid to form sideways or roadways". On the other hand, the term "$NO_x$-cleaning" means "removing $NO_x$ by decomposition by the catalytic action of titanium dioxide when subjected to light such as sunlight".

Embodiments of the $NO_x$-cleaning paving block of the present invention include the following $NO_x$-cleaning paving blocks, without being limited thereto:

1) an $NO_x$-cleaning paving block having a surface layer which contains titanium dioxide and which is layered on a concrete-made base layer;
2) an $NO_x$-cleaning paving block as described in 1) above whose surface layer contains 100 parts by weight of cement, 5–50 parts by weight of titanium oxide powder and 100–700 parts by weight of sand;
3) an $NO_x$-cleaning paving block as described in 1) above whose surface layer contains an adsorbing material;
4) an $NO_x$-cleaning paving block as described in 3) above whose adsorbing material is contained in the surface layer at a weight ratio of 5–30 to 100 parts by weight of the total composition of the surface layer except water;
5) an $NO_x$-cleaning paving block as described in 3) whose absorbing material is zeolite, Magadiite or clay;
6) an $NO_x$-cleaning paving block as described in 3) above wherein petalite is the adsorbing material;
7) an $NO_x$-cleaning paving block as described in 1) above wherein the thickness of the surface layer is 2–15 mm;
8) an $NO_x$-cleaning paving block as described in 2) above wherein at least part of the sand comprises glass grains or silica sand;
9) an $NO_x$-cleaning paving block as described in 2) above wherein 10–50% of the sand has been replaced by glass beads and/or glass powder having a particle size of 1–6 mm;
10) an $NO_x$-cleaning paving block as described in 1) above, the surface layer of which has a void volume of 10–40% and a water permeability of 0.01 cm/sec. or higher;
11) an $NO_x$-cleaning paving block as described in 1) above, wherein the titanium dioxide containing mortar-made surface layer is layered on the block base layer and then cured, and the surface of the mortar-made surface layer is then roughened with taps of many projections from a surface-roughening tool;
12) an $NO_x$-cleaning paving block as described in 11) above, whose surface layer contains an adsorbing material;
13) an $NO_x$-cleaning paving block as described in 12) above, wherein the adsorbing material is present in the surface layer at a weight ratio of 5–30 to 100 parts by weight of the total composition of the surface layer except water;
14) an $NO_x$-cleaning paving block as described in 12) above, wherein zeolite, Magadiite or clay is the adsorbing material;
15) an $NO_x$-cleaning paving block as described in 12) above, wherein petalite is the adsorbing material;
16) an $NO_x$-cleaning paving block as described in 2) above, wherein the thickness of the surface layer is 2–15 mm;
17) an $NO_x$-cleaning paving block as described in 2) above, wherein the surface layer has a void volume of 10–40% and a water permeability of 0.01 cm/sec. or higher;
18) an $NO_x$-cleaning paving block as described in 2) above, wherein a titanium dioxide containing mortar-made surface layer is layered on the block base layer and then cured, and the surface of the mortar-made surface layer is then roughened with taps of many projections from a surface-roughening tool;
19) an $NO_x$-cleaning paving block as described in 18) above, wherein the surface layer contains an adsorbing material;
20) an $NO_x$-cleaning paving block as described in 19) above, wherein the adsorbing material is present in the surface layer at a weight ratio of 5–30 to 100 parts by weight of the total composition of the surface layer except water;
21) an $NO_x$-cleaning paving block as described in 19) above, wherein zeolite, Magadiite and clay is the adsorbing material;
22) an $NO_x$-cleaning paving block as described in 19) above, wherein petalite is the adsorbing material; and
23) an $NO_x$-cleaning paving block as described in 20) above, wherein the thickness of the surface layer is 2–15 mm.

In greater detail, the $NO_x$-cleaning paving block of the present invention comprises a surface layer which contains titanium dioxide, and further comprises a surface layer which contains 100 parts by weight of cement, 5–50 parts by weight of titanium oxide powder and 100–700 parts by weight of sand in a preferred embodiment thereof. Titanium oxide catalyzes the change of $NO_x$ to nitrate ions. Since the nitrate ions are stabilized by being neutralized with the alkaline components of the concrete, the paving blocks, therefore, provide a measure of environmental protection. Since the slippery property of the titanium dioxide powder is suppressed by the addition of sand to the surface layer, the surface layer has an excellent anti-slip property. The surface layer has an excellent anti-slip property and durability because of the incorporation of cement and sand therein. As a result, the $NO_x$-cleaning paving block of the present invention can be satisfactorily used for paving purposes.

The present $NO_x$-cleaning paving block has asperities on the surface layer containing a titanium oxide, specifically titanium dioxide, which are formed with taps. This characteristic feature of the invention enhances the $NO_x$-cleaning capability, anti-slip property and decorative property of the paving blocks. In addition, since the $NO_x$-cleaning paving block of the invention contains an adsorbing material in the surface layer, not only the $NO_x$ adsorbed thereon during the day is removed by decomposition by sunlight (specifically ultraviolet light) during the day, but also $NO_x$ is adsorbed on the adsorbing material even during the night and decomposed by ultraviolet light during the day, thus removing the $NO_x$.

The photocatalytic efficiency of the blocks can be increased by increasing the available surface area by setting the void volume of the surface layer of the $NO_x$-cleaning paving block to 10–40% and the water permeability thereof to 0.01 cm/sec. or higher. Further, when the present $NO_x$-cleaning paving block has a high water permeability, the pluvial cleaning effect is also increased. Accordingly, the invention provides a highly economical, $NO_x$-cleaning paving block.

The thickness of the surface layer of the present block is 2–15 mm, and preferably 2–10 mm. It has been found that if the thickness of the surface layer exceeds 15 mm, then it is difficult for sunlight to penetrate into the interior of the surface layer with the result that the action on the titanium dioxide decreases, and thus it is useless to provide the titanium dioxide layer with a greater thickness. On the other hand, the $NO_x$-cleaning efficiency is reduced, and further the durability is impaired when the thickness is less than 2 mm.

When glass beads or silica sand having a high light transmission property is used as the sand which composes the surface layer of the present paving blocks, a sufficient amount of light penetrates to the depths of the blocks to increase the $NO_x$-cleaning efficiency. If it is desired to form a surface layer having a large void volume, sand of extremely uniform particle size is used to form a film of a mixture of cement and titanium oxide on the surface of the sand. Particles of the sand which are coated with the mixture of cement and titanium oxide are preferably combined with each other through the function of the mixture. The configuration results in an increase in the available surface area which contributes to a higher photocatalytic efficiency and thus increases the $NO_x$-cleaning efficiency, and also results in an increase in the water permeability which enhances the cleaning effect.

The particle size of the sand which can be used according to the present invention preferably ranges from 1.2 to 5 mm. The presence of a mixture of cement and titanium oxide powder as the binding material in an excess proportion relative to the sand results in a lower void volume. Accordingly, the effective void volume is 10–40%, preferably 15–30%. If the void volume is less than 10%, a sufficient a available surface area can not be provided, and the $NO_x$-cleaning efficiency is reduced. On the other hand, if the void volume exceeds 40%, though the $NO_x$-cleaning efficiency increases, the strength of the blocks is reduced, which adversely affects the durability required for a paving block. In order to set the void volume within a range of 10–40%, the ratio between the sand and the binding material is preferably such that the binding material is present in a proportion of 18–100% by weight of the sand.

Furthermore, the $NO_x$-cleaning efficiency can be increased by providing a photoreflective layer beneath the surface layer. It is desirable to compose the photoreflective layer with a mixture of cement and white particles or a white pigment, such as titanium dioxide. Furthermore, the surface of the surface layer can be made uneven to increase the light absorbability of the layer and the area of contact with the air, and further the anti-slip property of the blocks. The unevenness can be established by providing a form for forming the blocks with asperities or by grinding.

The grinding can be performed with a diamond blade or another tool, or by any appropriate processing such as sand blasting. The asperities can be zigzagged, corrugated or trapezoid in cross-section. The asperities can be formed by tapping the surface layer to roughen the surface. As a result, the surface layer has a very rough surface with large asperities. The surface layer can be finished so that it has a rough surface by tapping it with many projections from a surface-roughening tool, which is described later, on the mortar-made surface layer, for example. The surface of the surface layer can be made uneven by other methods as well, thereby increasing the light absorbability of the layer and the area of contact with the air, and further improving the anti-slip property of the blocks.

In addition, the surface of the surface layer can be decorated as desired provided that the effects described above are not impaired. In cases where the surface roughening processing is successively carried out, the blocks are placed on carriages and tapped from above with a vertically reciprocating (over a span of 3 cm for example), surface-roughening tool having downward-pointing projections a required number of times (1–10) while horizontally reciprocating the carriages. The surface layer which has an uneven surface provided by surface-roughening processing which includes tapping on the surface layer in this way, is highly aesthetically pleasing and decorative.

In the present invention, the unevenness of the surface of the surface layer preferably measures 2–7 mm in depth, with a preferable crest spacing of 4–10 mm.

The mortar which can be used to compose the surface layer preferably consists of 100 parts by weight of cement, 5–50 parts by weight of titanium dioxide powder and 100–700 parts by weight of sand, and the $NO_x$, removed by the action of titanium dioxide is converted into nitrate ions which are then stabilized by neutralization by the alkaline components of the concrete, thus helping to protect the environment. In addition, the incorporation of sand minimizes the slipperiness of the titanium dioxide powder and thus provides the block with anti-slip properties. Furthermore, since cement and aggregate are present, the anti-slip property and the durability are at adequate levels for paving purposes.

The amount of titanium dioxide which can be used to prepare the surface layer, though depending on the types, particle sizes, etc. of the titanium dioxide, is 5–50 parts by weight and preferably 10–50 parts by weight in terms of titanium dioxide powder, per 100 parts by weight of cement. More preferably, the titanium dioxide powder comprises 20–50 parts by weight.

In cases where the amount of titanium dioxide powder in the surface layer of the present invention is lower than 5 parts by weight per 100 parts by weight of cement, the $NO_x$-cleaning efficiency of the surface layer is impaired, whereas not only the anti-slip property is reduced, but also the wear resistance is impaired when the amount exceeds 50 parts by weight. On the other hand, the amount of the sand is 100–700 parts by weight, preferably 100–400 parts by weight per 100 parts of cement. If the amount of the sand is less than 100 parts by weight per 100 parts by weight of cement, the surface layer has a lower anti-slip property and wear resistance, whereas if the amount of the sand is greater than 700 parts by weight, the $NO_x$-cleaning efficiency is impaired, since the amount of titanium dioxide powder is relatively reduced. The present surface layer preferably has a composition consisting of 10–50 parts by weight, preferably 20–50 parts by weight, of titanium dioxide powder and 100–400 parts by weight of sand per 100 parts by weight of cement.

The present $NO_x$-cleaning paving block can be prepared by any appropriate method, including a method by which a concrete dough is charged into a form and leveled, and a surface layer-forming dough is then placed on the concrete dough to form a laminate (cf. Japanese Unexamined Patent Application Disclosure HEI 3-169901, lines 14–19 in the left column on page 1). In addition to the method described above, the concrete-made base layer and the surface layer can be separately formed and set, and then combined, though the former method is preferable.

The base layer of the block is usually a concrete-made base layer, but the base layer is not limited thereto. The concrete-made base layer is prepared with a dough of cement and aggregate. The base layer-forming aggregate can be any of the materials which are conventionally used in the technical field concerned, including sand, natural stones, gravel, crushed stones, and the like. The cement does not need to be restricted to any particular type, and includes normal Portland cement, high early strength Portland cement, moderate heat Portland cement, super high early strength Portland cement, sulfate-resistant Portland cement, white Portland cement, Portland blast furnace cement, fly ash cement, silica cement, alumina cement, superfast-setting cement, etc. The surface layer which is layered on the block base layer is preferably made of mortar comprising cement, titanium dioxide powder and aggregate, wherein the cement which is used in the mortar can be any of Portland cement, high early strength cement, white cement, alumina cement and the like. White cement is preferable for its enhanced photoreflectivity. The titanium dioxide can be of either rutile or anatase crystal structure, and preferably is anatase-type titanium dioxide for its higher activity.

In addition, the sand used in the surface layer can be either natural sand or artificial sand. Further, the sand can be replaced by one or more materials selected from the group of granite, quartzite, lightweight aggregate, glass grains and silica sand. The particle size of these materials should be from 1.2 to 5 mm. However, in order to guide beams of ultraviolet light to the depths of the surface layer of the block in order to increase the $NO_x$-cleaning and adsorbing efficiency of the present blocks, it is desirable to replace part of the sand by highly light-transmittable aggregate (hereunder referred to as "light-transmittable aggregate") which can be glass beads, glass powder, silica sand or the like, preferably with a particle size of 1–6 mm in diameter. If the light-transmittable aggregate used has a larger particle size, the strength decreases due to the increased proportion of the cement-free portions, whereas the light transmittability is impaired when the light-transmittable aggregate used has a smaller particle size.

In cases where part of the sand is replaced by a light-transmittable aggregate such as glass beads, glass powder, silica sand or the like, the amount of the same relative to the total amount of the aggregate usually is 10–50% by weight, preferably 15–50% by weight, more preferably 20–50% by weight. If the amount of the light-transmittable aggregate is less than 10% by weight, the light-transmitting effect is not produced, whereas the amount of the sand is reduced and eventually the block has a lower strength if the amounts are higher than 50% by weight.

The light-transmittable aggregate available for use has a wide range of particle size or grain size, which is appropriately selected depending on the manner in which the blocks are used.

Also, in the present invention, the surface layer can contain an adsorbing material which can be any conventional catalytic carrier. A particularly preferred material is zeolite, a conventional carrier which has a number of uses and has been confirmed to have a high adsorbing effect. The zeolite can be either naturally occurring zeolite or artificial zeolite.

Arduinite, a zeolite mineral which is represented by the chemical formula: $(Ca, K_2, Na_2)(AlSi_5O_{12}).7H_2O$, contains water of crystallization. The water of crystallization is present as molecules of water; the structure is not destroyed even after having been dehydrated, and the spaces from which the molecules of water have been removed become voids. It has been reported that the voids adsorb gas, for which the mineral has an adsorbing action. Clay minerals, which have water of crystallization as well, are effective as the adsorbing material. The clay available for use can be any, and includes Nerme clay and Kibushi clay, for example. Magadiite $(Na_2Si_{14}O_{29}.nH_2O)$ is also effective as the adsorbing material. Magadiite is a clay mineral resembling, hydrated sodium silicate of a laminar crystal structure which is, however, free of aluminum.

In addition to the above-mentioned concrete examples of the adsorbing material, petalite can used as the adsorbing material according to the present invention as well. Petalite is a white or gray mineral which resembles quartz in appearance, and mineralogically is a silicate mineral $(Li_2OAl_2O_3.8SiO_2)$ which belongs to the feldspar family. Petalite contains a smaller proportion of impurities and is found in a larger quantity than other lithium minerals. Petalite is a conventional ceramic raw material used for many uses, and is further capable of adsorbing NO and $NO_2$ gas. When compared with other adsorbing materials, petalite is characterized by contributing to the increased strength, particularly bending strength of products containing it. Although the details of this mechanism are not yet known, it is sure that petalite not only serves as an adsorbing material, but also as an aggregate, and thus is suitable as a paving material.

The adsorbing material, which can be selected from a variety of candidates, can be incorporated into the surface layer in an appropriate proportion which allows NO and $NO_2$ gas to be adsorbed. The amount of adsorbing material can be determined as desired, by a simple test, with consideration given to the cost, the quantitative correlation between the cement and titanium dioxide, the strength, $NO_x$-cleaning efficiency, and the like. The adsorbing material is mixed into the surface layer in an amount of 5–30 parts by weight, preferably approximately 7–25 parts by weight per 100 parts by weight of the surface layer except water. If the amount of the adsorbing material is less than 5 parts by weight, the adsorbing effect is insufficient, and the adsorbing performance is imperfect during nights free of sunlight. On the other hand, in amounts which exceed 30 parts by weight, the cost increases, and the quantities of cement and titanium dioxide relatively decrease, thus lowering the strength and the $NO_x$-cleaning efficiency.

The present invention also allows a photoreflective layer to be provided beneath the surface layer to increase the $NO_x$-cleaning efficiency. The photoreflective layer should be composed of a mixture of cement and white particles or a white pigment such as titanium dioxide.

Figure 10A:
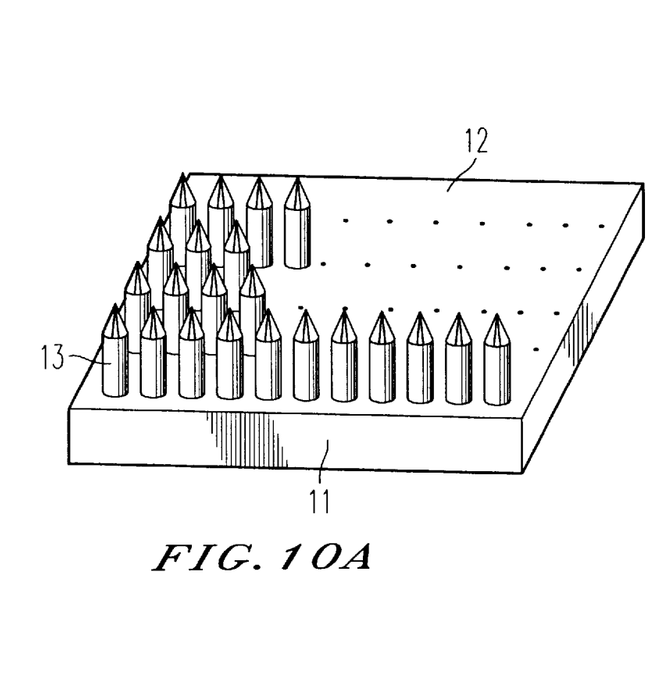
FIG. 10a is a perspective view of projections from the surface of a surface-roughening tool.
Figure 10B:
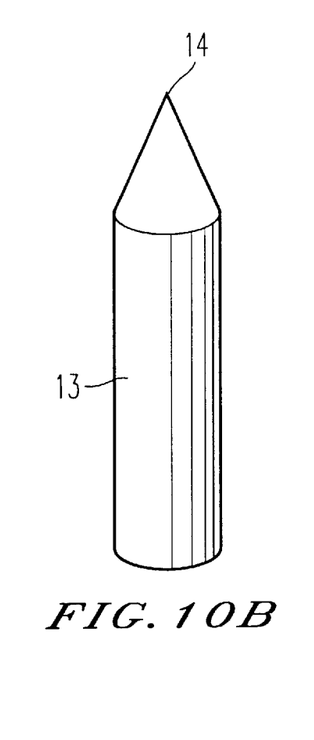
FIG. 10b is a perspective view of the shape of one of the projections of the surface-roughening tool.
Figure 10C:
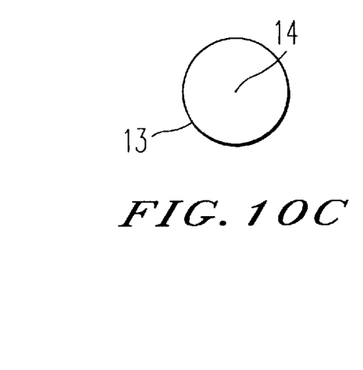
FIG. 10c is a plan view of the surface roughening tool.

A surface-roughening tool which can be used in the present invention will now be described in detail with reference to FIG. 10 through FIG. 12, without being restricted thereto. All the surface-roughening tools which are similar to and achieve the same results as the tool illustrated are of course within the scope of the present invention. In the drawings, like numerals indicate like structural members. In FIG. 10(a), projections 13 are placed on the surface 12 of a surface-roughening plate 11 in order or in a random fashion. As illustrated in FIG. 10(b) and FIG. 10(c), the tip of each projection 13 is shaped as a pointed end 14 with which the surface of each $NO_x$-cleaning block is tapped to cut into the surface in order to form predetermined hollows, thereby roughening the surface. The hollows should be 2 mm or more in depth when the anti-slip property and the $NO_x$-cleaning capability are considered.

Figure 11A:
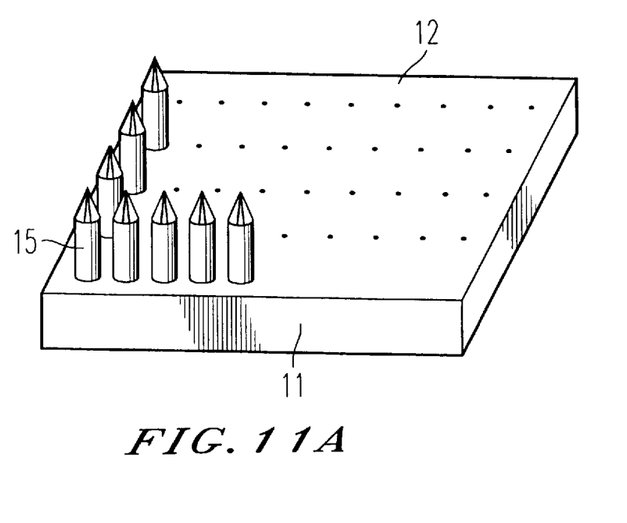
FIG. 11a is a perspective view of other projections from the surface of a surface-roughening tool.
Figure 11B:
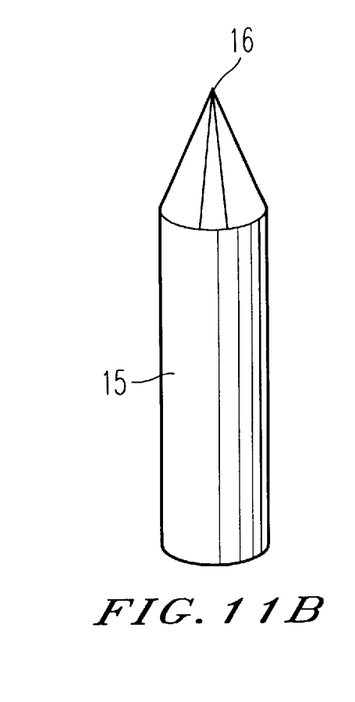
FIG. 11b is a perspective view of the shape of one of the projections of the surface roughening tool.
Figure 11C:
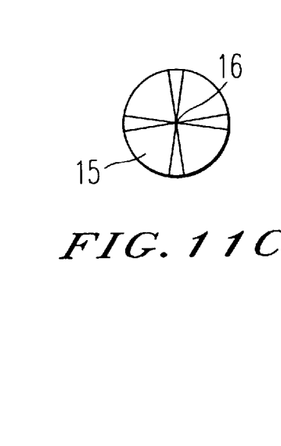
FIG. 11c is a plan view of the surface roughening tool.

In FIG. 11(a), projections 15 are placed on the surface 12 of the surface-roughening plate 11 in order or in a random fashion. As illustrated in FIG. 11(b) and FIG. 11(c), the tip of each projection 15 is shaped as a pointed end 16 such as the tip of a Phillips screwdriver, with which the surface of each $NO_x$-cleaning block is tapped to cut into the surface in order to form predetermined hollows, thereby roughening the surface.

Figure 12A:
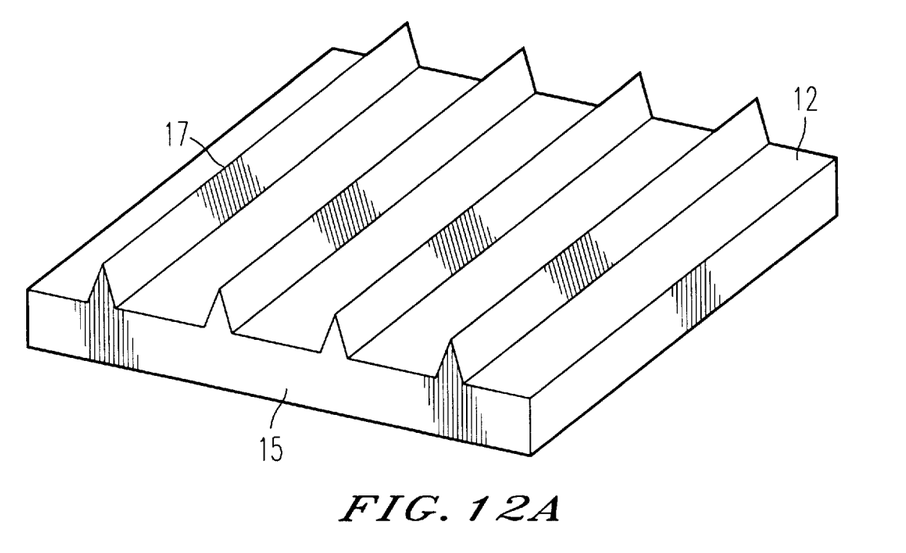
FIG. 12a is a perspective view of yet other projections from the surface of a surface-roughening tool.
Figure 12B:
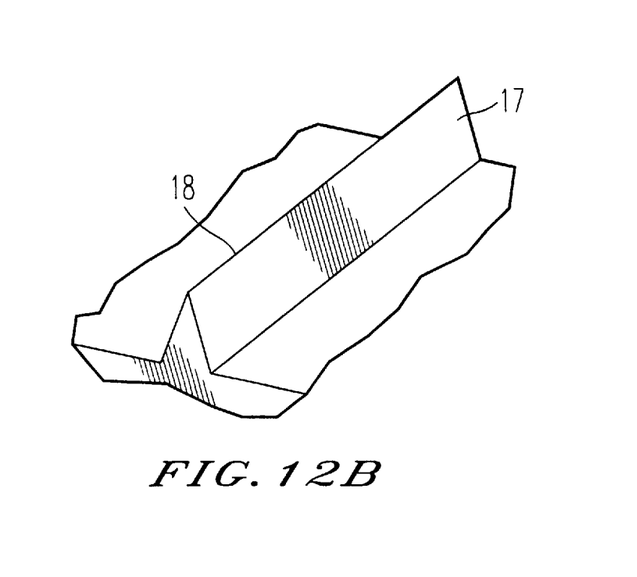
FIG. 12b is a perspective view of the shape of one of the projections of the surface-roughening tool.

In FIG. 12(a), projections 17 are placed on the surface 12 of a surface-roughening plate 15 in order in the width direction. As illustrated in FIG. 12(b), the tip of each projection 17 is shaped as a pointed end 18 with which the surface of each $NO_x$-cleaning block is tapped to cut into the surface in order to form predetermined hollows, thereby roughening the surface.

When the $NO_x$-cleaning block of the present invention is prepared, the surface roughening treatment is preferably performed after a curing period of 2–7 days, preferably 3–5 days, and more preferably 3 days following the formation of the block.

In carrying out the present invention, if the surface-roughening step is conducted too early after the curing period, the degree of surface roughness is insufficient, and this results not only in failure to increase the anti-slip property and the surface area, but also in a larger number of times the surface-roughening tool must be cleaned to remove the visible grime thereon, thus impairing the operational efficiency. On the other hand, if the surface-roughening step is conducted too late after the curing period, the cement in the surface layer excessively sets, and this makes it difficult to form satisfactory hollows in the surface-roughening step. In the present invention, the number of times the tapping is conducted with a surface-roughening tool is not particularly limited provided that the hollows are properly formed, and is appropriately determined depending on the degree of cure of the surface of the $NO_x$-cleaning block.

When the block is prepared using a concrete-made base layer, the block achieves durability, and the nitrate ions resulting from the $NO_x$ are neutralized by the alkaline components of the concrete. The use of glass or silica glass as the sand provides the block with a highly light-transmittable property in addition to an anti-slip property and wear resistance.

It is also possible according to the present invention to allow ultraviolet light to penetrate into the depths of the surface layer by replacing part of the sand in the surface layer by a light-transmittable aggregate. In addition, the unevenness of the surface allows light to strike the surface from all directions. Furthermore, the surface roughness provided by tapping the surface results in an increased anti-slip property, and also allows light to strike on the surface from all directions, thereby enhancing the $NO_x$-cleaning capability and improving the aesthetically pleasing and decorative property. Further, the surface roughness of the $NO_x$-cleaning block is efficiently accomplished only by tapping the surface with simple means such a surface-roughening tool with many projections, as described above. The adsorbing material which is contained in the surface layer of the $NO_x$-cleaning block adsorbs and removes $NO_x$ produced during the night. The $NO_x$, produced during the night is decomposed and removed by exposure to ultraviolet light during the day. In addition, the void volume of the surface layer is set to 10–40% and the water permeability coefficient is set at 0.01 cm/sec. or higher in order to increase the available surface area and the photocatalytic efficiency. An increase in the water permeability coefficient results in a higher degree of cleaning effectiveness.

Having generally described this invention, a further understanding can be obtained by reference to certain specific examples which are provided herein for purposes of illustration only and are not intended to be limiting unless otherwise specified.

EXAMPLE 1

In order to prepare a dough for forming a concrete-made base layer, 100 parts by weight of Portland cement, 31 parts by weight of water, 190 parts by weight of crushed stones and 240 parts by weight of sand were combined and kneaded. Separately, in order to prepare a dough for forming a surface layer, sand, 20 parts by weight of titanium dioxide and 80 parts by weight of Portland cement were combined and kneaded. The sand was used in amounts relative to the cement, listed in Table 1, to prepare Samples 1–4. Samples 1–4 were used to prepare four types of paving blocks as follows.

The dough for forming a concrete-made base layer was charged into a 10×20-cm form and shaped into objects while vibrating, after which the dough for forming a surface layer was placed on the base layer and covered with a die plate. The structures were then subjected to vibration under pressure (pressure: 0.25 kg/cm$^2$, number of vibrations: 3,140 r.p.m., amplitude of vibration: 1.4 mm; and vibration time under pressure: 3 sec.), followed by curing, to prepare Test specimens 1–4 which were 20 cm long, 10 cm wide and 8 cm thick, corresponding to Samples 1–4, respectively.

Figure 1:
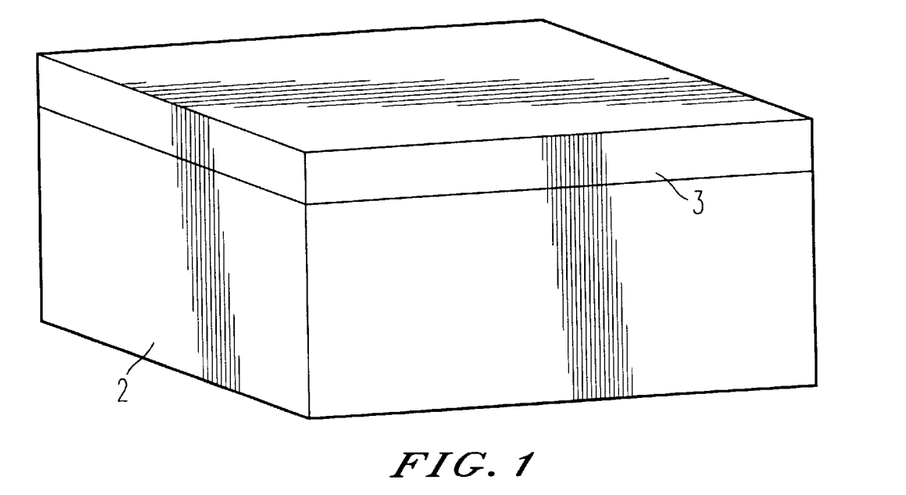
FIG. 1 is a perspective view of an $NO_x$-cleaning paving block of the present invention.

FIG. 1 is a perspective view illustrative of one of the blocks prepared as described above. Block 1 has a base layer 2 on which a 7-mm-thick surface layer 3 is layered. The results obtained are listed in Table 1.

The anti-slip properties of the paving blocks were measured according to ASTM E303. The method defined there is designed so as to rub a rubber slider mounted on one end of a pendulum arm against the surface to be tested and to measure the energy lost at that time. The measurement is required to be equal to or larger than 65 BPM.

The wear resistance test (labeling test) conducted was designed so that falling, rotating (200 r.p.m.) wheels (outer diameter: 205 mm, and width: 100 mm), half of which each had twelve chains with ten links, came into contact with a horizontally reciprocating (66 times per min.) test specimen to cut into and wear the surface. The amount of wear (unit: g per cm$^2$) was measured.

TABLE 1

| Test specimen | Cement: sand ratio (wt. ratio) | Slip resistance (BPM) | Labeling test (g/cm$^2$) | Remarks |
| --- | --- | --- | --- | --- |
| 1 | 1:3 | 85 | 1.5 | Wet state |
| 2 | 1:2 | 78 | 1.5 | (slip occurs |
| 3 | 1:1 | 72 | 2.0 | unless BPM is |
| 4 | 1:0 | 56 | 4.0 | 65 or more) |

EXAMPLE 2

Figure 2:
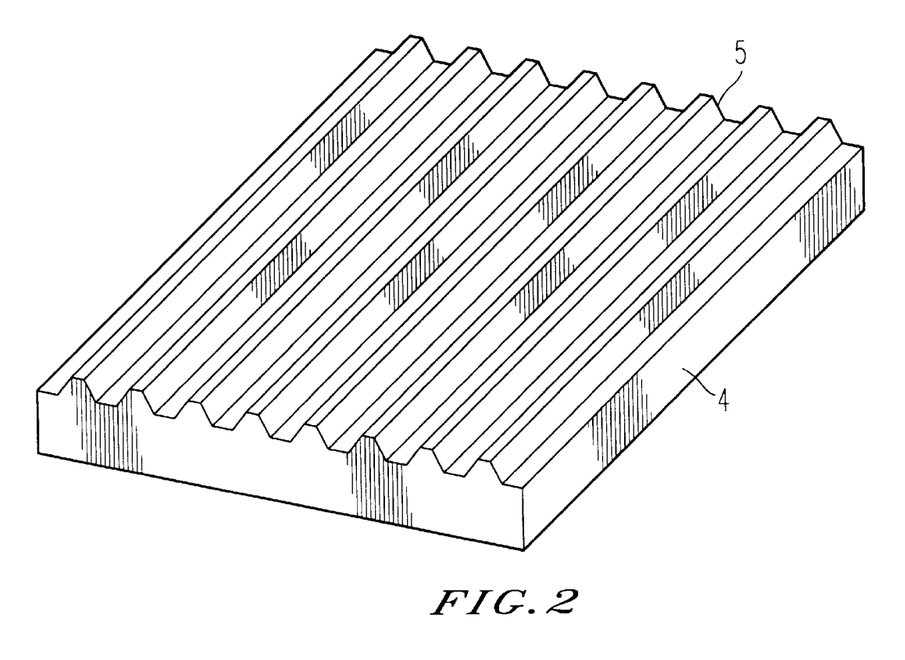
FIG. 2 is a cross-sectional view of a die plate for forming an $NO_x$-cleaning block having trapezoid cross-section asperities formed thereon.
Figure 5:
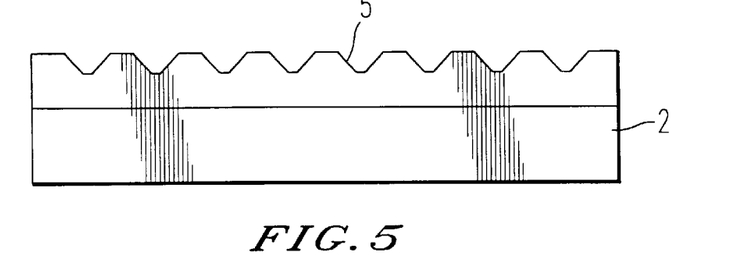
FIG. 5 is a cross-sectional view of an $NO_x$-cleaning paving block having trapezoid cross-section formed asperities thereon.

Test specimen 5 having a 1-to-3 cement-to-sand ratio was prepared in the same manner as in Example 1, except that, for the die plate having an uneven surface layer of Example 1, a die plate 4 having a surface 5 trapezoidal in cross-section was used, which in illustrated in the perspective view of FIG. 2. The block represented by Test specimen 5 is illustrated in the cross-sectional view of FIG. 5.

Figure 3:
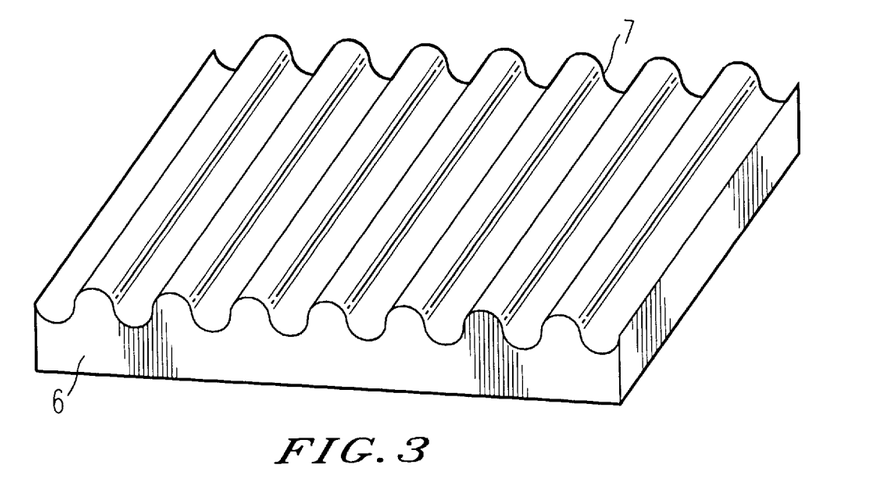
FIG. 3 is a cross-sectional view of a die plate for forming an $NO_x$-cleaning block having corrugated asperities formed thereon.
Figure 4:
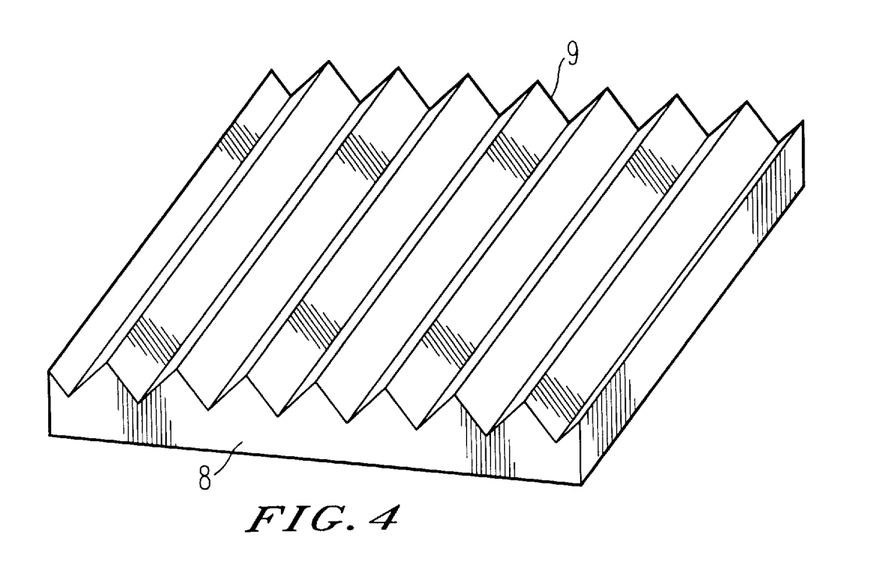
FIG. 4 is a cross-sectional view of a die plate for forming an $NO_x$-cleaning block having zigzag asperities formed thereon.
Figure 6:
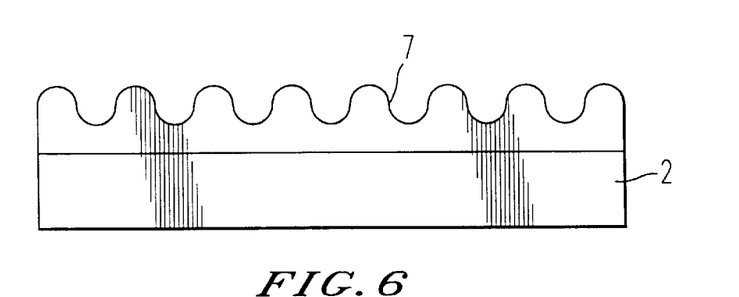
FIG. 6 is a cross-sectional view of an $NO_x$-cleaning paving block having corrugated asperities formed thereon.
Figure 7:
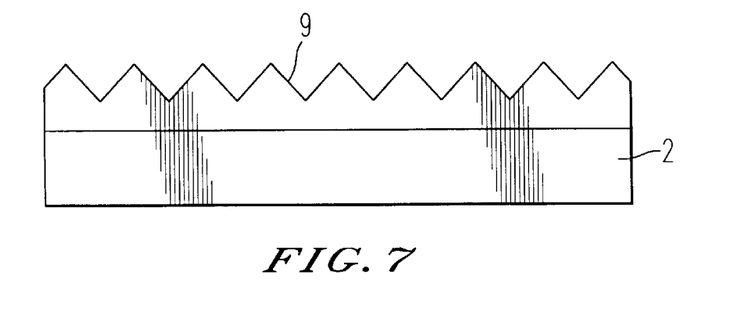
FIG. 7 is a cross-sectional view of an $NO_x$-cleaning paving block having zigzag asperities formed thereon.
Figure 8:
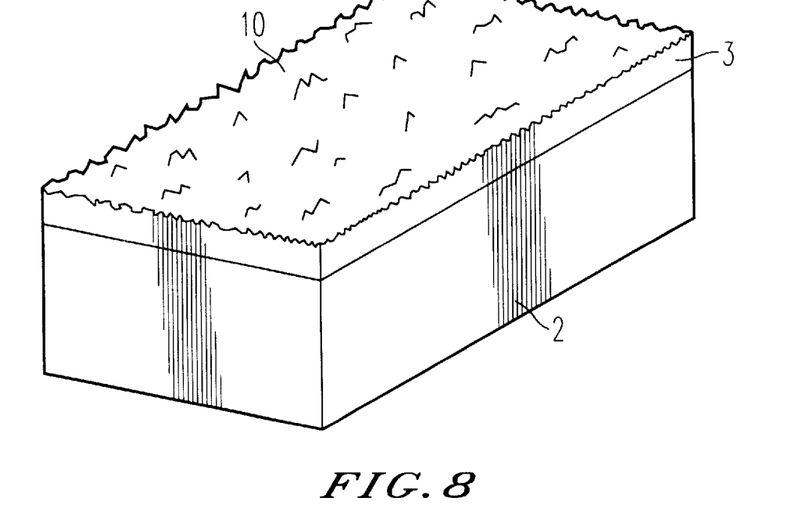
FIG. 8 is a perspective view of an $NO_x$-cleaning paving block of the present invention.

Test specimen 5 obtained had both a high anti-slip property and light transmittability, and efficiently removed NO$_x$. In addition, Test specimens 6 and 7, both having the same 1-to-3 cement-to-sand ratio as Test specimen 1, were prepared using a die plate 6 and a die plate 8 which had a corrugated surface 7 as shown in the perspective view of FIG. 3 and a zigzagged surface as shown in the perspective view of FIG. 4, respectively, instead of plate 4 having the surface 5 (trapezoidal in cross-section) which is illustrated in FIG. 2. The blocks obtained are shown in the cross-sectional views of FIG. 6 and FIG. 7. All the blocks prepared exhibited the excellent effects of the present invention.

EXAMPLE 3

Test specimen 8 having a 1-to-3 cement-to-sand ratio was prepared in the same manner as described in Example 1, except that 100 parts by weight of glass grains instead of sand were used to prepare the dough for forming a surface layer. Test specimen 8 obtained had both a high anti-slip property and light transmittability, and efficiently removed NO$_x$.

EXAMPLE 4

Test specimen 9 having a 1-to-1 cement-to-sand ratio was prepared in the same manner as described in Example 1, except for using 100 parts by weight of silica sand instead of the sand used to prepare the dough for forming a surface layer. Test specimen 9 obtained had both a high anti-slip property and light transmittability, and efficiently removed NO$_x$.

EXAMPLE 5

Test specimen 10 was prepared in the same manner as described in Example 4, except for roughening the surface of the surface layer by sand blasting. Test specimen 10 obtained had both a high anti-slip property and light transmittability, and efficiently removed NO$_x$.

EXAMPLE 6

In order to prepare a dough for forming a concrete-made base layer, 100 parts by weight of Portland cement, 25 parts by weight of water and 300 parts by weight of crushed stone were combined and kneaded. Separately, in order to prepare a dough for forming a surface layer, 600 parts by weight of crushed sand, an artificial sand, 30 parts by weight of titanium dioxide, 100 parts by weight of Portland cement and 25 parts by weight of water were combined and kneaded. The dough for forming a concrete-made base layer was charged into a 10×20-cm form and shaped into a Figure while vibrating, after which the dough for forming a surface layer was placed on the base layer and covered with a die plate, and then subjected to vibration under pressure in the same manner as described in Example 1. A paving block was obtained after curing.

The resulting block, comprising the 7-cm-thick base layer and the 1-cm-thick surface layer, had a base-layer void volume of 26%, a surface-layer void volume of 20%, and a water permeability of 0.10 cm/sec. The block further had both a high anti-slip property exemplified by 87 BPM and a high cleaning effect, and efficiently removed NO$_x$.

EXAMPLES 7–10

In order to prepare a dough for forming a concrete-made base layer, 500 parts by weight of Portland cement, 130 parts by weight of water and 180 parts by weight of aggregate (#4 crushed stones) were combined and kneaded. Separately, in order to prepare a dough for forming a surface layer, four formulations having the compositions listed in Table 2 were used to prepare the test specimens designated as Examples 7–10. Samples 7–10 were used to prepare four types of paving blocks as described below.

TABLE 2

| | Formulation | | | |
| --- | --- | --- | --- | --- |
| Ingredient | 1 | 2 | 3 | 4 |
| Portland cement | 600 | — | — | — |
| White cement | — | 500 | 600 | 650 |
| Glass bead | — | — | — | 300 |
| Quartz rock | — | — | 400 | — |
| Silica sand | 1,200 | 1,300 | 1,100 | 1,300 |
| Titanium dioxide | 210 | 250 | 150 | 120 |
| Water | 250 | 300 | 230 | 250 |

The dough for forming a concrete-made base layer was charged into 10×20-cm forms and shaped into objects while vibrating, after which the four types of dough for forming surface layers were placed on the respective base layers and covered with die plates, and then subjected to vibration under pressure (pressure: 0.25 kg/cm$_2$, number of vibrations: 3,140 r.p.m., amplitude of vibration: 1.4 mm; and vibration time under pressure: 3 sec.) in the same manner as described in Example 1, followed by curing and surface roughening processing. The surface-roughening processing was conducted with a surface-roughening tool (shown in Table 3) with many nail-like projections (made of steel (O 4 mm), spaced every 2.5 cm which was moved vertically over a span of 3 cm (6 times/min.) and horizontally over a span of 5 cm (twice/min.) while horizontally moving the blocks at a speed of up to 3 m/min. The resulting blocks 20 cm long, 10 cm wide and 7 cm thick were used as the test specimens.

Figure 9:
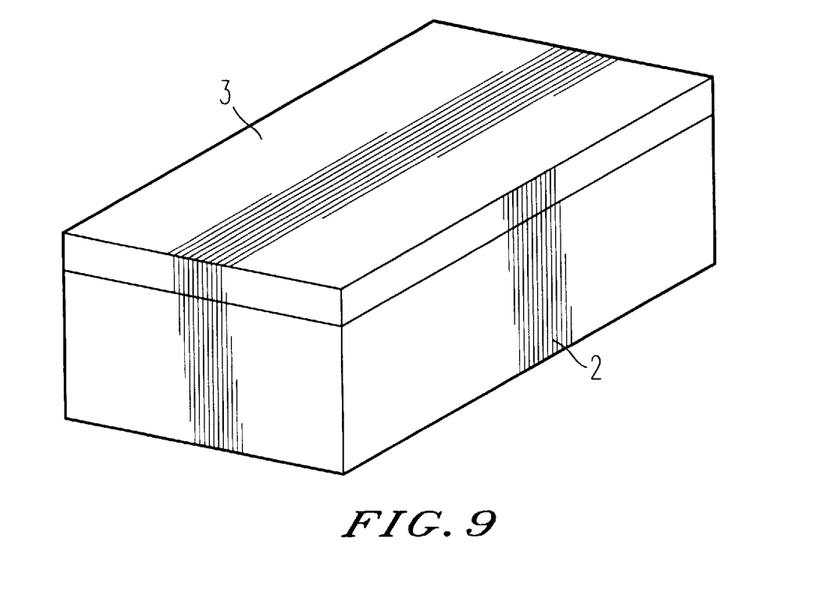
FIG. 9 is a perspective view of an $NO_x$-cleaning paving block of the present invention, but prior to roughening of the surface.

Comparative Examples were prepared in the same manner as described above, but without conducting any surface-roughening processing after curing. One of the resulting blocks is illustrated in the perspective view of FIG. 9. The illustrated block comprises a base layer 2 on which a surface layer 3 having a thickness of 7 mm is layered. The results obtained are shown in Table 3. Here, the anti-slip properties of the paving blocks were measured according to the method of ASTM E303. The method defined there is designed so as to rub a rubber slider mounted on one end of a pendulum arm against the surface to be tested and to measure the energy lost at that time. The measurement is required to be equal to or larger than 65 BPM.

On the other hand, the wear resistance test (labeling test) conducted was designed so that falling, rotating (200 r.p.m.) wheels (outer diameter: 205 mm, and width: 100 mm), half of which each had twelve chains with ten links, came into contact with a horizontally reciprocating (66 times per min.) test specimen to cut into and wear the surface, and the amount of wear (unit: g per cm$^2$) was measured. The $NO_x$-cleaning capability is expressed as the $NO_x$-removal coefficient, which is the ratio of the $NO_x$ concentration at the entrance to that at the exit of a vessel which held a 200 cm$^2$ sample while exposed to ultraviolet radiation. In the test air, which was measured having a $NO_x$ content of 1 ppm, was passed over the sample block.

TABLE 3

| Type | Formulation | Surface-roughing tool | Slip resistance (BPM) | | $NO_x$ removal coefficient (%) |
|---|---|---|---|---|---|
| | | | Wet state | Dry state | |
| Comp. Ex. 1 | 1 | Not used | 66 | 74 | 65 |
| Example 7 | 1 | FIG. 10 | 71 | 80 | 68 |
| Comp. Ex. 2 | 2 | Not used | 68 | 77 | 79 |
| Example 8 | 2 | FIG. 10 | 72 | 87 | 84 |
| Comp. Ex. 3 | 3 | Not used | 70 | 84 | 76 |
| Example 9-1 | 3 | FIG. 10 | 72 | 91 | 79 |
| Example 9-2 | 3 | FIG. 11 | 73 | 91 | 80 |
| Comp. Ex. 4 | 4 | Not used | 68 | 80 | 84 |
| Example 10-1 | 4 | FIG. 10 | 70 | 88 | 88 |
| Example 10-2 | 4 | FIG. 12 | 73 | 86 | 88 |

As is apparent from Table 3, Example 7 had a high anti-slip property because of the incorporation of Portland cement. In addition, the $NO_x$-cleaning capability was enhanced. Example 8 also had a high anti-slip property and further an even better $NO_x$-cleaning capability because of the incorporation of white cement into the sample and because of the uneven pattern resulting from tapping. It is apparent that both Example 9 and Example 10, prepared by using the surface roughening tools illustrated in FIG. 10, FIG. 11 and FIG. 12, had satisfactory $N_x$-cleaning capabilities.

EXAMPLE 11

The procedures described in Example 9 were followed, except that the surface-roughening processing was conducted after a curing period of 2 days or 7 days. When the surface-roughening processing was conducted after a curing period of 2 days, the required number of taps was decreased, but the product must be allowed to stand for a while after the surface-roughening processing. The surface-roughening tool used had visible grime.

In contrast, when the surface-roughening processing was conducted after a curing period of 7 days, the surface set somewhat excessively, and this caused the required number of taps to increase, with the result that the surface-roughening processing was conducted to a satisfactory degree. The working life of the surface-roughening tool used was, however, slightly shortened. In either case, the effects of the present invention were produced.

EXAMPLE 12

The procedures described in Example 7 were followed, except that the surface layer was prepared using white cement instead of Portland cement, and additionally contained 160 parts by weight of zeolite, and the surface-roughening processing was carried out as described in Example 7. The addition of the adsorbing material allowed the $NO_x$ adsorbed during the night to be cleaned off during the day, thus enhancing the $NO_x$-cleaning capability. In addition, the surface-roughening processing contributed to a higher anti-slip property.

EXAMPLES 13–22

In order to prepare a block base layer, 100 parts by weight of Portland cement, 195 parts by weight of crushed stone, 240 parts by weight of sand and 31 parts by weight of water were combined and kneaded to prepare a dough, and the dough was charged into a 10×20-cm form which was then vibrated to shape a concrete-made base layer on which one of 12 types of dough formulations for forming surface layers was placed to form each of the test specimens designated as Examples 13–22 and Comparative Examples 5–6 in Table 4. The NO removal coefficients of the test specimens were measured after curing.

TABLE 4

| | White cement | Crushed stone | Glass bead (1) | Glass powder | Titanium dioxide powder | Zeolite | Petalite | Magadiite | Gaerome clay |
|---|---|---|---|---|---|---|---|---|---|
| Example 13 | 100 | 220 | | | 25 | 40 | | | |
| Example 14 | 100 | 220 | | | 25 | | 40 | | |
| Example 15 | 100 | 220 | | | 25 | | 80 | | |
| Example 16 | 100 | 220 | | | 25 | | | 40 | |
| Example 17 | 100 | 220 | | | 25 | | | | 40 |
| Example 18 | 100 | 176 | | 44 | 25 | | 40 | | |
| Example 19 | 100 | 176 | 22 | 22 | 25 | | 40 | | |
| Example 20 | 100 | 220 | | 88 | 25 | | 40 | | |
| Example 21 | 100 Portland cement | 220 | | | 25 | 40 | | | |
| Example 22 | 100 High early strength cement | 220 | | | 25 | 40 | 40 | | |
| Comp. Ex. 5 | 100 White cement | 220 | | | 25 | | | | |

TABLE 4-continued

| | White cement | Crushed stone | Glass bead (1) | Glass powder | Titanium dioxide powder | Zeolite | Petalite | Magadiite | Gaerome clay |
|---|---|---|---|---|---|---|---|---|---|
| Comp. Ex. 6 | 100 Portland cement | 220 | | | 25 | | | | |

(unit: wt. part)

The test was conducted by placing a test specimen in a gastight vessel having an inlet through which a stream of a simulated gas containing 1 ppm of NO gas was supplied. The concentration of NO in the gas leaving through the exit was measured to determine the NO removal coefficient. The test was conduced over 24 hours, and the average of the removal coefficients measured every ten minutes was recorded as the test result.

Test 1 was conducted with three 10-watt ultraviolet lamps remaining on continuously over 24 hours. Test 2 was conducted while switching the ultraviolet lamps on and off every two hours. Accordingly, the lamps were glowing for 12 hours throughout the 24-hour test period.

Here, of the Examples and Comparative Examples, the test specimens designated as Examples 13, 14, 16 and 17 and Comparative Example 5 were subjected to a strength test called a three-point bending test. The test results are reported in Table 5.

TABLE 5

| | NO removal coefficient (%) | | Bending strength (Kgf/cm$^2$) |
|---|---|---|---|
| | Test 1 | Test 2 | |
| Example 13 | 81 | 53 | 65 |
| Example 14 | 81 | 54 | 73 |
| Example 15 | 84 | 58 | — |
| Example 16 | 82 | 55 | 63 |
| Example 17 | 83 | 56 | 64 |
| Example 18 | 82 | 55 | — |
| Example 19 | 81 | 56 | — |
| Example 20 | 84 | 55 | — |
| Example 21 | 77 | 43 | — |
| Example 22 | 78 | 43 | — |
| Comp. Ex. 5 | 77 | 42 | 63 |
| Comp. Ex. 6 | 72 | 38 | — |

As is apparent from Table 5, Examples 13–22, which incorporate the adsorbing materials, are capable of cleaning off more $NO_x$ than the Comparative Examples. Particularly, white cement contributed to a higher $NO_x$ removal coefficient than Portland cement. Even in Test 2, in which the lamps were switched on and off, more $NO_x$ was removed. This effect was particularly significant when glass powder was added. The high-performance $NO_x$-cleaning blocks described above had substantially the same bending strength as well.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An $NO_x$-cleaning paving block, comprising:
   a surface layer comprising 100 parts by weight of cement, 5–50 parts by weight of titanium dioxide powder and 100–700 parts by weight of sand which of said which is layered on a concrete-made base layer, said surface layer having a void volume of 10–40% and a water permeability of at least 0.01 cm/sec, said block promoting the photodecomposition of $NO_x$ sorbed by said surface layer.

2. The $NO_x$-cleaning paving block as claimed in claim 1, wherein the surface layer contains an adsorbing material.

3. The $NO_x$-cleaning paving block as claimed in claim 2, wherein the adsorbing material is present in the surface layer at a weight ratio of 5–30 to 100 parts by weight of the total composition of the surface layer except water.

4. The $NO_x$-cleaning paving block as claimed in claim 2, wherein the adsorbing material is one or more of zeolite, Magadiite or clay.

5. The $NO_x$-cleaning paving block as claimed in claim 2, wherein the adsorbing material is petalite.

6. The $NO_x$-cleaning paving block as claimed in claim 1, wherein the thickness of the surface layer is 2–15 mm.

7. The $NO_x$-cleaning paving block as claimed in claim 1, wherein at least part of the sand comprises glass grains or silica sand.

8. The $NO_x$-cleaning paving block as claimed in claim 1, wherein 10–50% of the sand has been replaced by glass beads, glass powder having a particle size of 1–6 mm or combination thereof.

9. The $NO_x$-cleaning paving block as claimed in claim 1, wherein a titanium dioxide-containing mortar-made surface layer is layered on the block base layer and then cured, and the surface of the mortar-made surface layer is then roughened with taps of many projections from a surface roughening tool.

10. The $NO_x$-cleaning paving block as claimed in claim 9, wherein the surface layer additionally contains an adsorbing material.

11. The $N_x$-cleaning paving block as claimed in claim 10, wherein the adsorbing material is contained in the surface layer at a weight ratio of 5–30 to 100 parts by weight of a total composition of the surface layer except water.

12. The $NO_x$-cleaning paving block as claimed in claim 10, wherein the adsorbing material is one or more of zeolite, Magadiite or clay.

13. The $NO_x$-cleaning paving block as claimed in claim 10, wherein the adsorbing material is petalite.

* * * * *

UNITED STATES PATENT AND TRADEMARK OFFICE
CERTIFICATE OF CORRECTION

PATENT NO. : 5,861,205
DATED : January 19, 1999
INVENTOR(S) : Yoshihiko MURATA, et al.

It is certified that error appears in the above-identified patent and that said Letters Patent is hereby corrected as shown below:

Column 10, line 67, "g per cm$^2$" should read --cm$^2$--;

Column 11, in Table 1, the column heading, "Labeling test (g/cm$^2$)" should read --Labeling test (cm$^2$)--;

Column 12, line 51, "Table 3" should read --Fig.10--;

Column 12, line 52, "(◯ 4 mm)" should read --(Ø 4 mm)--;

Column 13, line 10, "g per cm$^2$" should read --cm$^2$--;

Column 16, line 53, "The N$_x$-cleaning" should read --The NO$_x$-cleaning--.

Signed and Sealed this

Sixteenth Day of May, 2000

Attest:

Q. TODD DICKINSON

*Attesting Officer*          *Director of Patents and Trademarks*